(12) United States Patent
Kile

(10) Patent No.: US 9,807,939 B1
(45) Date of Patent: Nov. 7, 2017

(54) SPIKED THRESHING BAR AND COMBINE HARVESTER THRESHER FORMED THEREWITH

(71) Applicant: Ronald J. Kile, Rosalia, WA (US)

(72) Inventor: Ronald J. Kile, Rosalia, WA (US)

( * ) Notice: Subject to any disclaimer, the term of this patent is extended or adjusted under 35 U.S.C. 154(b) by 112 days.

(21) Appl. No.: 14/876,527

(22) Filed: Oct. 6, 2015

(51) Int. Cl.
*A01F 12/34* (2006.01)
*A01F 12/22* (2006.01)

(52) U.S. Cl.
CPC .................................. *A01F 12/22* (2013.01)

(58) Field of Classification Search
CPC .. A01F 12/22; A01F 7/06; A01F 12/20; A01F 12/00; A01F 7/067
See application file for complete search history.

(56) References Cited

U.S. PATENT DOCUMENTS

| | | | | |
|---|---|---|---|---|
| 3,203,428 A * | 8/1965 | Ausherman | .............. | A01F 12/20 460/71 |
| 4,889,517 A * | 12/1989 | Strong | .................... | A01F 12/22 460/66 |
| 4,936,810 A * | 6/1990 | Strong | ....................... | A01F 7/06 460/69 |
| 5,035,675 A * | 7/1991 | Dunn | ....................... | A01F 12/22 460/122 |
| 5,192,245 A * | 3/1993 | Francis | .................... | A01F 12/22 460/110 |
| 6,264,553 B1 * | 7/2001 | Neumann | ................ | A01F 12/20 460/71 |
| 6,325,714 B1 * | 12/2001 | Tanis | ....................... | A01F 12/22 460/71 |
| 2007/0026913 A1 * | 2/2007 | Kuchar | .................... | A01F 12/22 460/112 |
| 2008/0167101 A1 * | 7/2008 | Farley | ...................... | A01F 12/22 460/72 |
| 2012/0214560 A1 * | 8/2012 | Murray | .................... | A01F 12/22 460/71 |

FOREIGN PATENT DOCUMENTS

SU 1029888 A * 7/1983 ............. A01F 12/20

* cited by examiner

*Primary Examiner* — Arpad Fabian-Kovacs
(74) *Attorney, Agent, or Firm* — Michael W. Goltry; Robert A. Parsons; Parsons & Goltry

(57) ABSTRACT

A combine harvester threshing drum spiked threshing bar includes a rigid, integral, unitary threshing fixture having a leading edge, a trailing end, an upstream face, a downstream face, a threshing side, including a trailing threshing face and a leading threshing face, a threshing drum emplacement side, and a threshing spike that extends outwardly from the leading threshing face.

6 Claims, 7 Drawing Sheets

US 9,807,939 B1

SPIKED THRESHING BAR AND COMBINE HARVESTER THRESHER FORMED THEREWITH

FIELD OF THE INVENTION

The present invention relates to combine harvesters.

More particularly, the present invention relates to combine harvester threshers.

In a further and more specific aspect, the present invention relates to threshing bars of combine harvester threshers.

BACKGROUND OF THE INVENTION

Agriculture is a major industry in the U.S., which is a net exporter of food. As of 2009 there were approximately 2.2 million farms in the U.S. covering an area of approximately 920 million acres. Although in 1800 approximately ninety percent of the entire U.S. population was employed in agriculture, present day numbers have dropped to approximately two percent due largely to the development and implementation of large, automated agricultural equipment, such as combine harvesters, which have replaced large numbers of farm workers.

The crops grown in the U.S., such as wheat, barley, and rye, are only partly edible. While the seeds or grains at the top of each plant are edible and useful for making products such as bread and cereal, the rest of the plant, which is known as the chaff, is inedible and has to be discarded. Before modern-day machines were developed, such as in the 1800's, agricultural workers had to harvest crops by carrying out a series of laborious operations one after another. First they had to cut down the plants with a long-handled cutting tool such as a scythe. Next, they had to separate the edible grain from the inedible chaff by beating the cut stalks in an operation known as threshing. Finally, they had to clean any remaining debris away from the seeds to make them suitable for use in a mill. All this took a considerable amount of time and labor requiring large numbers of farm workers. The modern combine harvester carries out these various operations automatically eliminating the need for numerous farm workers.

In operation, a combine harvester is driven through a field of a growing crop, whereby the combine harvester cuts, threshes, and separates the grain from the chaff using rotating blades, wheels, sieves, and elevators. The grain collects in a tank inside the combine harvester, which is periodically emptied into tractors that drive alongside, while the chaff is ejected onto the field from an ejection spout at the back of the combine harvester.

In general, a combine harvester includes a header, a pickup reel, a cutter, a threshing drum, sieves, a collection tank, and conveyors, such as rotating belts and spinning augers. The header gathers the crop, and the pickup reel pushes the crop down toward the cutter, which cuts the crop at the base near ground level. A conveyor picks up the cuttings from the cutter, and conveys the cuttings to the threshing drum, which rotates and threshes the cuttings separating the grains from the chaff to form threshings, namely, the chaff and the separated grains. A conveyance conveys the threshings along the thresher from an upstream location of thresher to a downstream location of thresher as the thresher rotates and the grains fall through sieves into a collection tank inside the combine harvester, which is periodically emptied, such as into tractors that drive alongside, while a conveyor takes up and conveys the chaff to the ejection spout for ejection onto the field. Some combine harvesters have a rotating spreader mechanism that throws the chaff over a wide area, while others have bailers that bail the chaff for later use, such as for animal bedding.

Existing combine harvester threshers are complicated and difficult and expensive to maintain. Because some crops require aggressive threshing and others require less aggressive threshing, a thresher must be carefully chosen and installed to meet the given threshing performance required for the particular crop to be threshed. For farmers that grow various crops, this often requires the farm to maintain numerous combine harvesters at a substantial cost with threshers configured for different crops, or to periodically replace threshers for meeting the specified threshing needs of the given crops to be threshed. Given these and other deficiencies in the art, there is a need in the art for a threshing drum that may be easily and efficiently maintained and serviced, and that may be easily and efficiently configured to meet different crop-specific threshing requirements. There is also a need in the art for improved threshing implements useful with threshing drums for threshing crops having tough straw, such as wheat, barley, and rice.

SUMMARY OF THE INVENTION

According to the principle of the invention, a spiked threshing bar includes a rigid, integral, unitary threshing fixture having a leading edge and an opposed trailing end, a first outer face and an opposed second outer face, and a top threshing side and an opposed bottom threshing drum emplacement side. The opposed first and second outer faces extend between the top threshing side and the opposed bottom threshing drum emplacement side of the threshing fixture from the leading edge of the threshing fixture to the trailing end of the threshing fixture. The top threshing side includes a trailing threshing face and a leading threshing face that meet at a corner formed in the top threshing side. The corner is between the leading edge and the trailing end of the threshing fixture and extends from the first face to the second face. The trailing threshing face extends between the opposed first and second outer faces of the threshing fixture from the trailing end to the corner. The leading threshing face extends between the opposed first and second outer faces of the threshing fixture from the corner to the leading edge, and inclines downwardly relative to the trailing threshing face from the corner and meets, and cooperates with, the bottom threshing drum emplacement side and the opposed first and second outer faces of the threshing fixture at the leading edge to form a wedge in the threshing fixture. A spike has a threshing surface. The spike extends outwardly from the leading threshing face to the threshing surface. The threshing surface is between the leading edge and the corner and is directed outwardly and forwardly of the leading threshing face toward the leading edge of the threshing fixture to be available for threshing crop cuttings ahead of the trailing threshing face. There is a threshing attack angle of from 100 degrees to 120 degrees between the threshing surface of the spike and the leading threshing face. The threshing surface is planar. The trailing threshing face includes crop-threshing grooves.

According to the principle of the invention, a spiked threshing bar includes a rigid, integral, unitary threshing fixture includes a leading edge and an opposed trailing end, a first outer face and an opposed second outer face, a top threshing side having a crop-threshing rasp structure, and a bottom threshing drum emplacement side. The opposed first and second outer faces extend between the top threshing side and the opposed bottom threshing drum emplacement side of the threshing fixture from the leading edge of the threshing fixture to the trailing end of the threshing fixture. The top threshing side includes a trailing threshing face and a leading threshing face that meet at a corner formed in the top threshing side. The corner is between the leading edge and the trailing end of the threshing fixture and extends from the first face to the second face. The trailing threshing face extends between the opposed first and second outer faces of the threshing fixture from the trailing end to the corner. The leading threshing face extends between the opposed first and second outer faces of the threshing fixture from the corner to the leading edge, and inclines downwardly relative to the trailing threshing face from the corner and meets, and cooperates with, the bottom threshing drum emplacement side and the opposed first and second outer faces of the threshing fixture at the leading edge to form a wedge in the threshing fixture. A spike has a threshing surface. The spike extends outwardly from the leading threshing face of the top threshing side relative to crop threshing rasp structure to the threshing surface. The threshing surface is between the leading edge and the corner and is directed outwardly and forwardly of the leading threshing face toward the leading edge of the threshing fixture to be available for threshing crop cuttings ahead of the trailing threshing face. There is an attack angle of from 100 degrees to 120 degrees between the threshing surface of the spike and the leading threshing face. The threshing surface is planar. The crop-threshing rasp structure includes grooves.

BRIEF DESCRIPTION OF THE DRAWINGS

Referring to the drawings.

DETAILED DESCRIPTION

Figure 1:
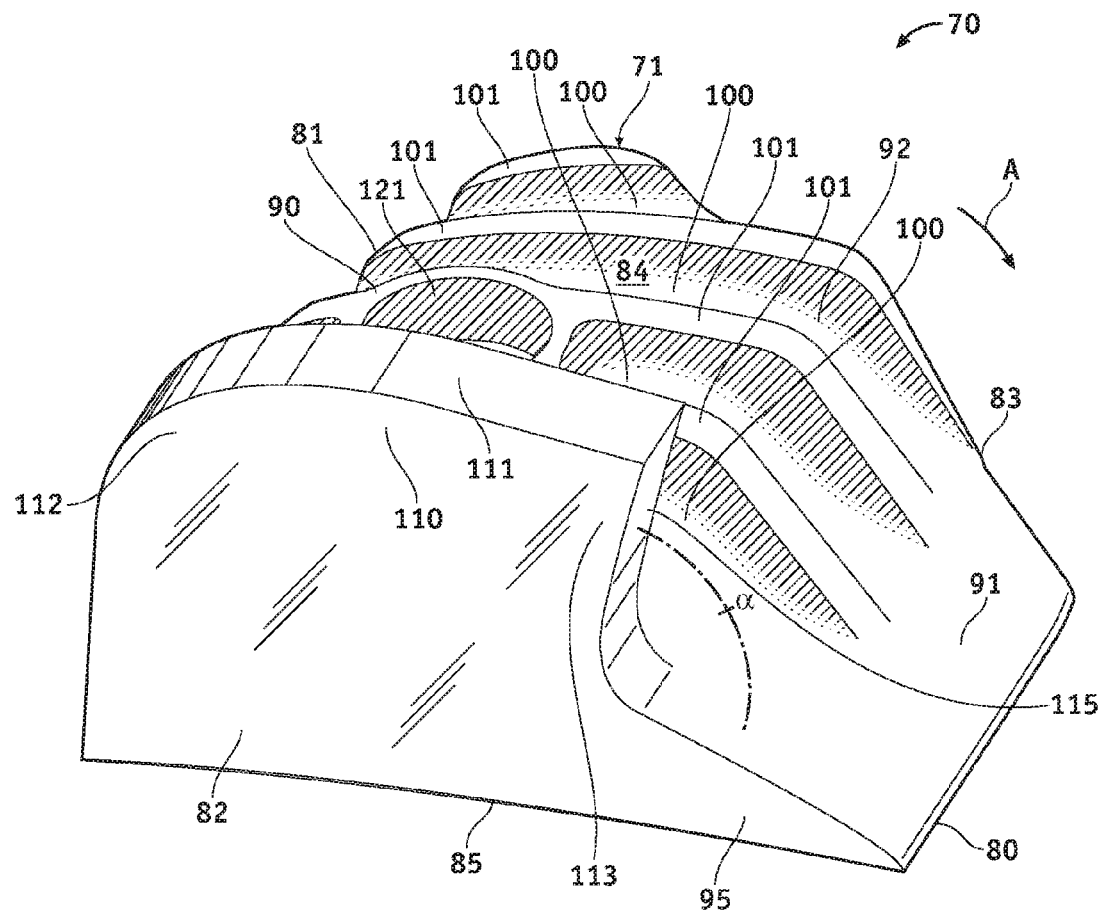
FIG. 1 is a front perspective view of a threshing bar according to the invention.

In general, a combine harvester includes a header, a pickup reel, a cutter, a conveyer formed between the cutter and the thresher, a thresher including a threshing drum having a cylindrical exterior configured with threshing bars, a concave under the thresher, sieves, a collection tank, and an array of conveyors, such as rotating belts and spinning augers. In the operation of a combine harvester as it is driven through a crop to be harvested, the header gathers the crop, and the pickup reel applies the crop to the cutter, which cuts the crop at the base near ground level to form crop cuttings or, simply, cuttings. The conveyor picks up the cuttings from the cutter, and conveys the cuttings to the thresher for threshing. The thresher rotates and threshes the cuttings along the thresher concave separating the grains from the chaff to form threshings, namely, the chaff and the separated grains. The grains fall through the sieves into the collection tank inside the combine harvester, which is periodically emptied, such as into tractors that drive alongside, while a conveyor takes up and conveys the chaff to an ejection spout for ejection onto the field.

Turning now to the drawings, in which like reference characters indicate corresponding elements throughout the several views, FIGS. 1-8 illustrate a threshing bar 70 constructed and arranged according to the invention. Looking briefly to FIGS. 9 and 10, a thresher 50 includes a threshing drum 60 having a cylindrical outer surface or exterior 61 configured with threshing bars 70. Threshing drum 60 is mounted for rotation relative to a thresher concave 51 in a threshing direction, or threshing direction of rotation, generally indicated by arrowed line A. Arrowed line A indicates the direction of rotation of threshing drum 60, which is the direction of travel of threshing bars 70 applied to threshing drum 60. A population of threshing bars 70, each constructed and arranged in accordance with the principle of the invention, is affixed to cylindrical exterior 61 of threshing drum 60 for threshing a crop applied between cylindrical exterior 61 of threshing drum 60 and thresher concave 51 in response to rotation of threshing drum 60 in the threshing direction indicated by arrowed line A. Threshing bars 70 thresh the crop cuttings between cylindrical exterior 61 and thresher concave 51 separates the grains from the chaff to form threshings, namely, the chaff and the separated grains, in response to rotation of threshing drum 60 in the threshing direction. The separated grains fall through sieves and are applied into the collection tank inside the combine harvester, which, again, is periodically emptied, such as into tractors that drive alongside, while a conveyor takes up and conveys the chaff to an ejection spout for ejection onto the field.

Figure 2:
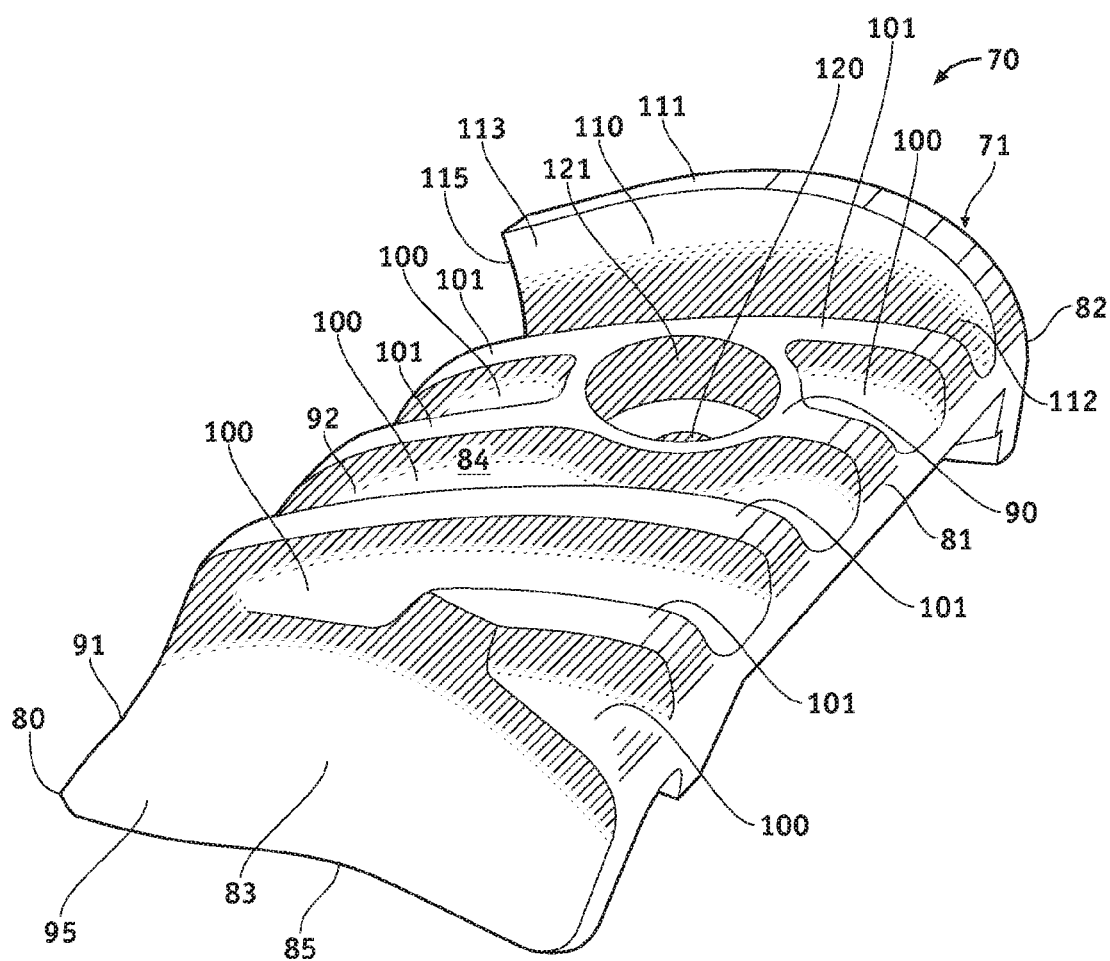
FIG. 2 is a rear perspective view of the embodiment of FIG. 1.
Figure 3:
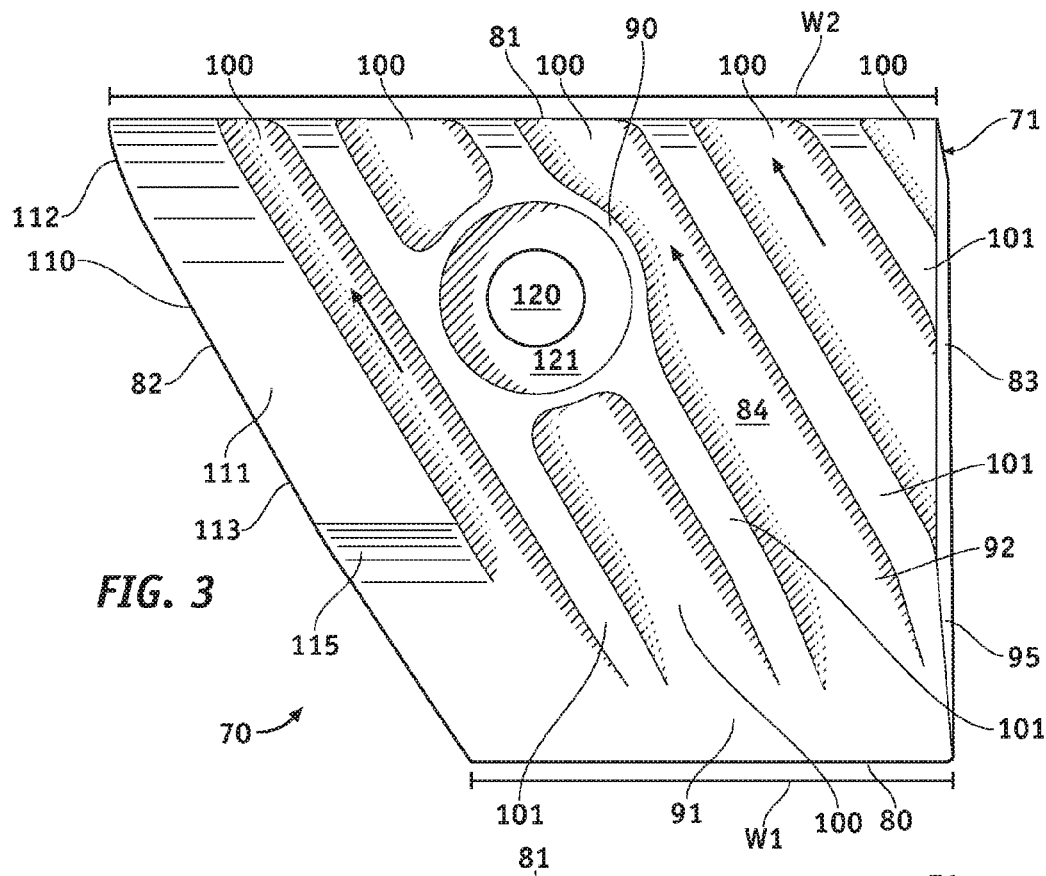
FIG. 3 is a top plan view of the embodiment of FIG. 1.
Figure 4:
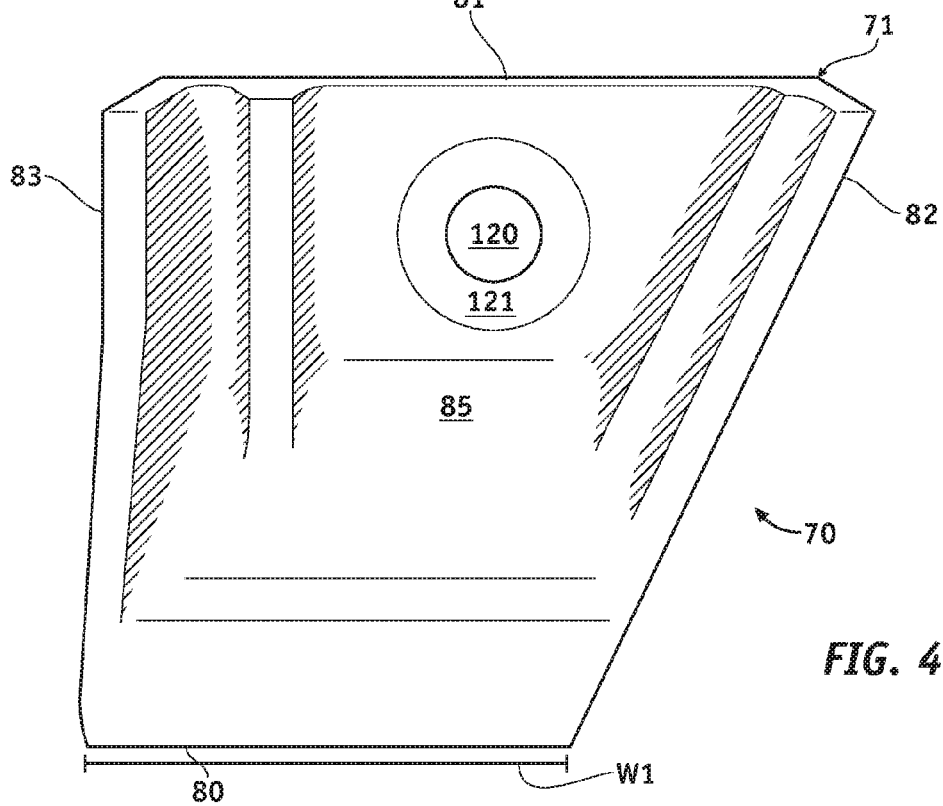
FIG. 4 is a bottom plan view of the embodiment of FIG. 1.
Figure 5:
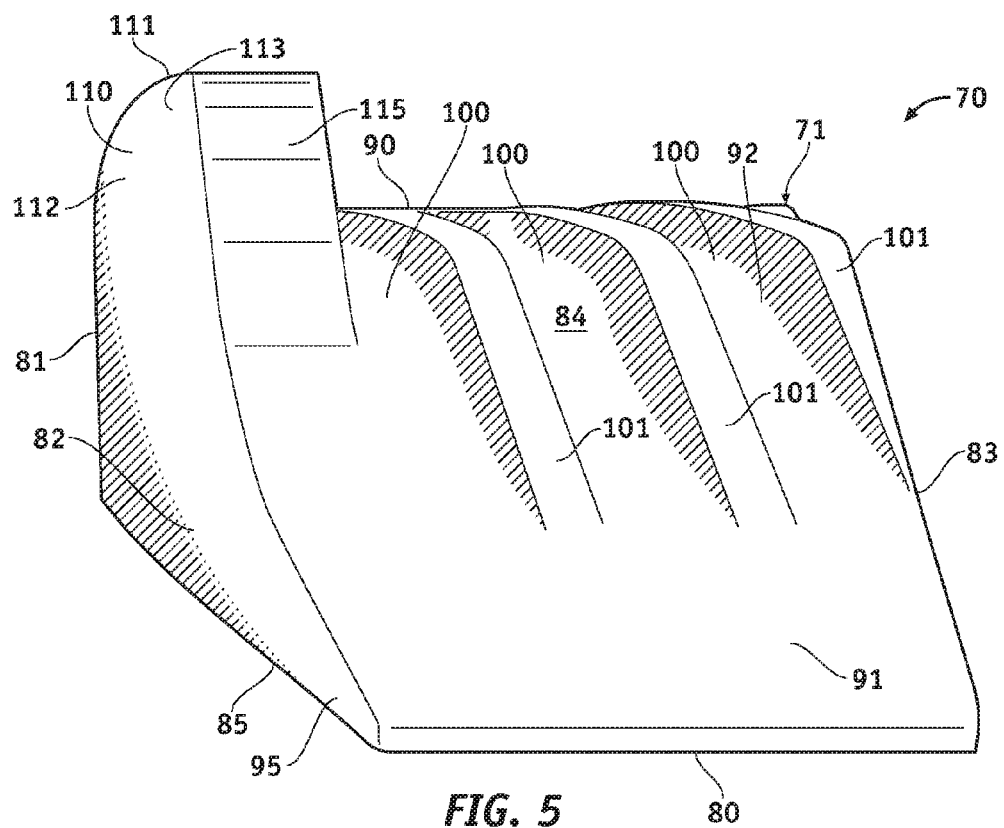
FIG. 5 is a front elevation view of the embodiment of FIG. 1.
Figure 6:
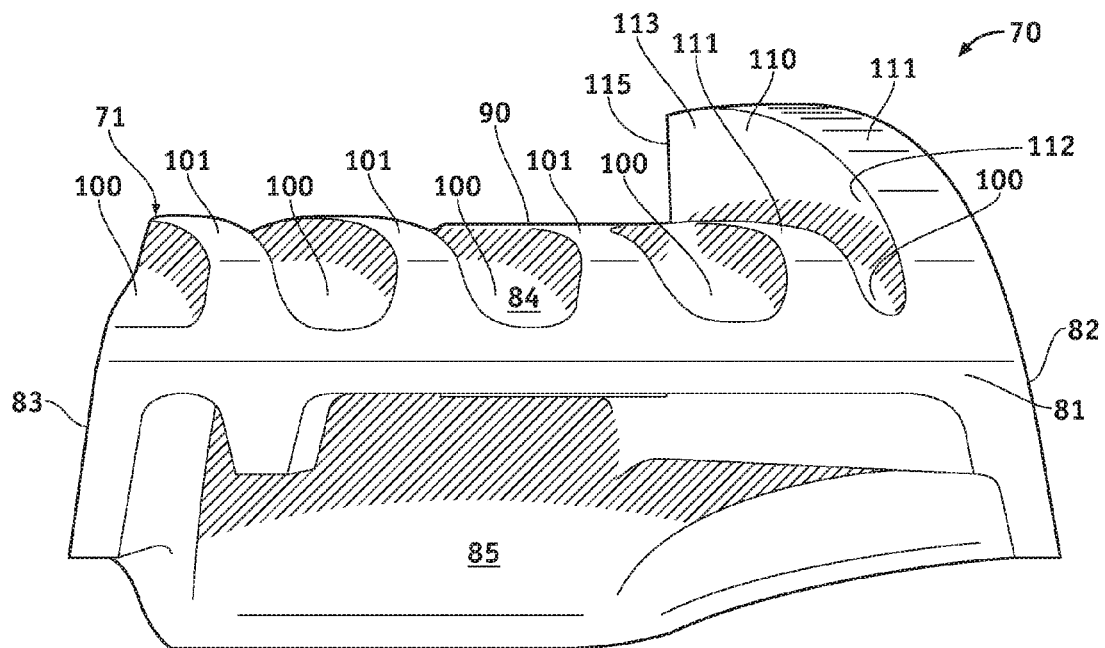
FIG. 6 is a rear elevation view of the embodiment of FIG. 1.
Figure 7:
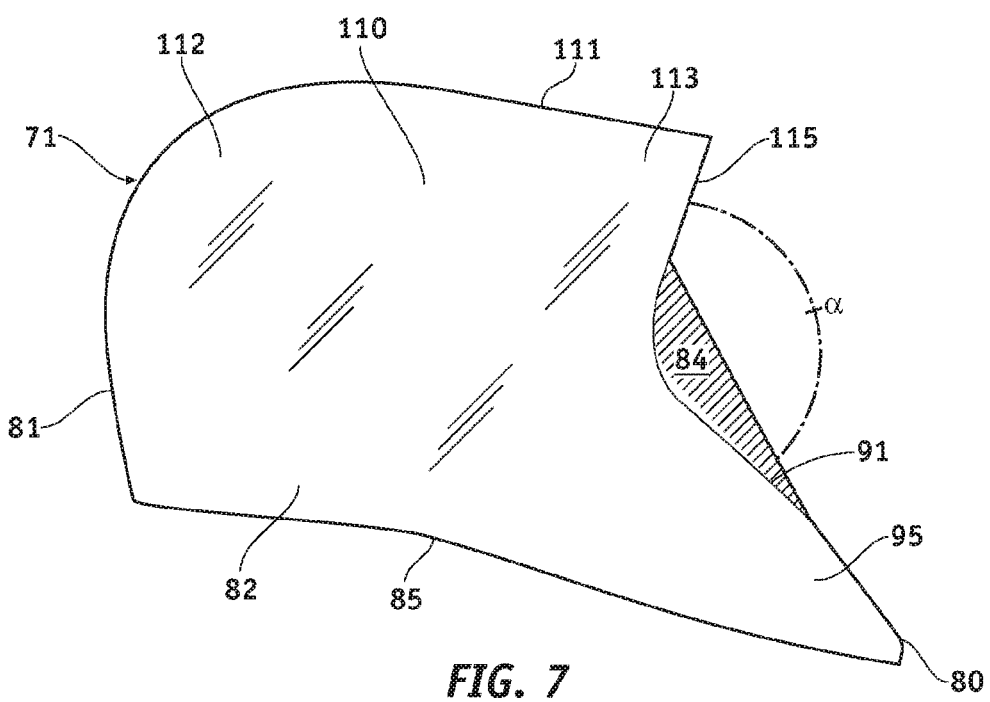
FIG. 7 is a left side elevation view of the embodiment of FIG. 1.
Figure 8:
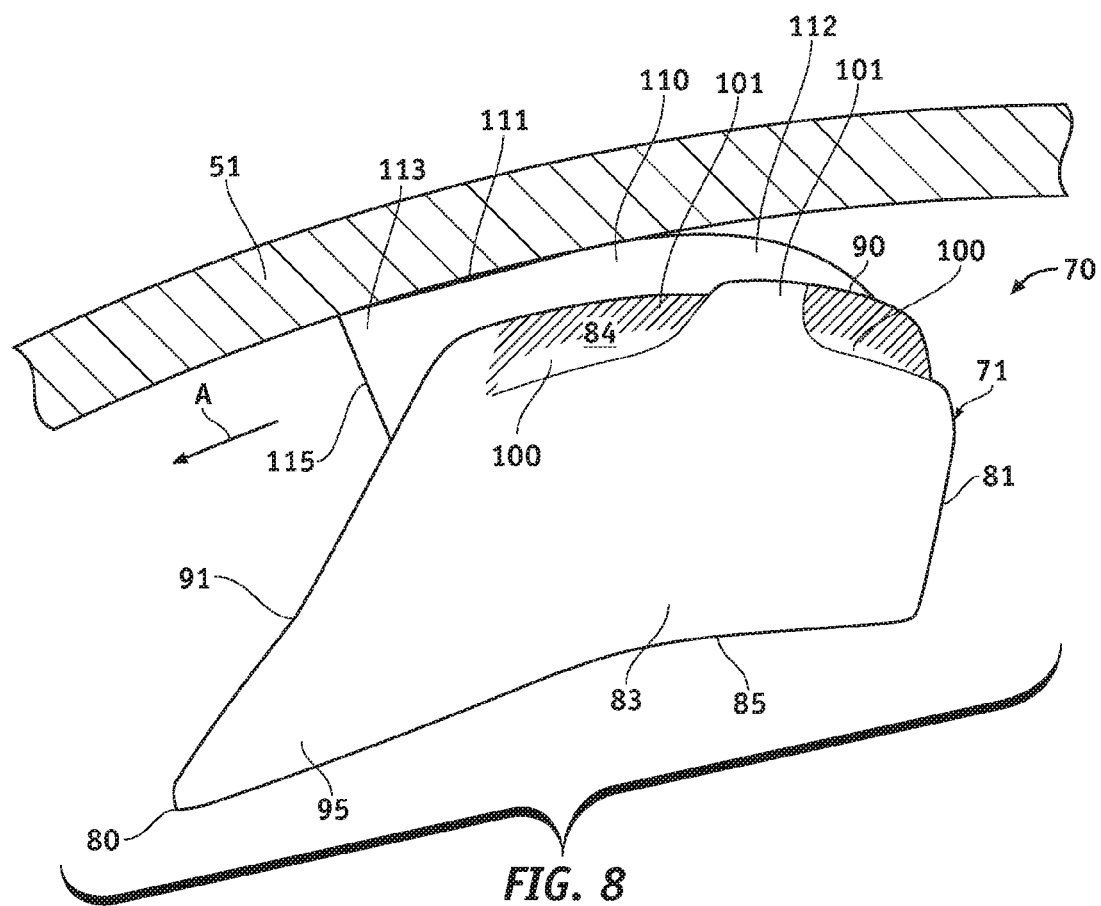
FIG. 8 is a right side elevation view of the embodiment of FIG. 1 shown as it would appear operatively positioned adjacent to a section view of a thresher concave.
Figure 9:
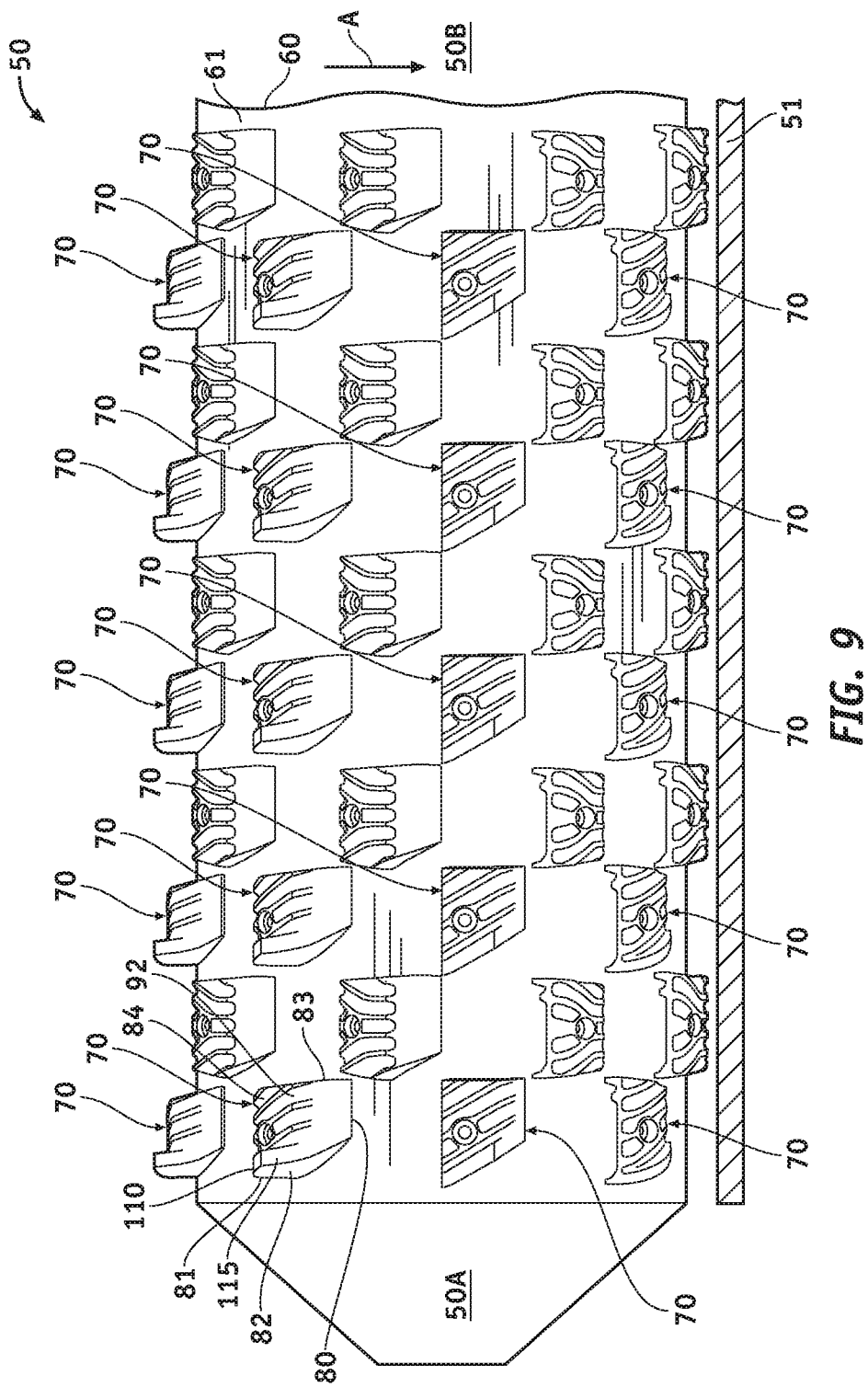
FIG. 9 is a fragmented, front elevation view of a thresher, including a threshing drum formed with threshing bars each according to the embodiment of FIG. 1, operatively positioned adjacent to a section view of a thresher concave.
Figure 10:
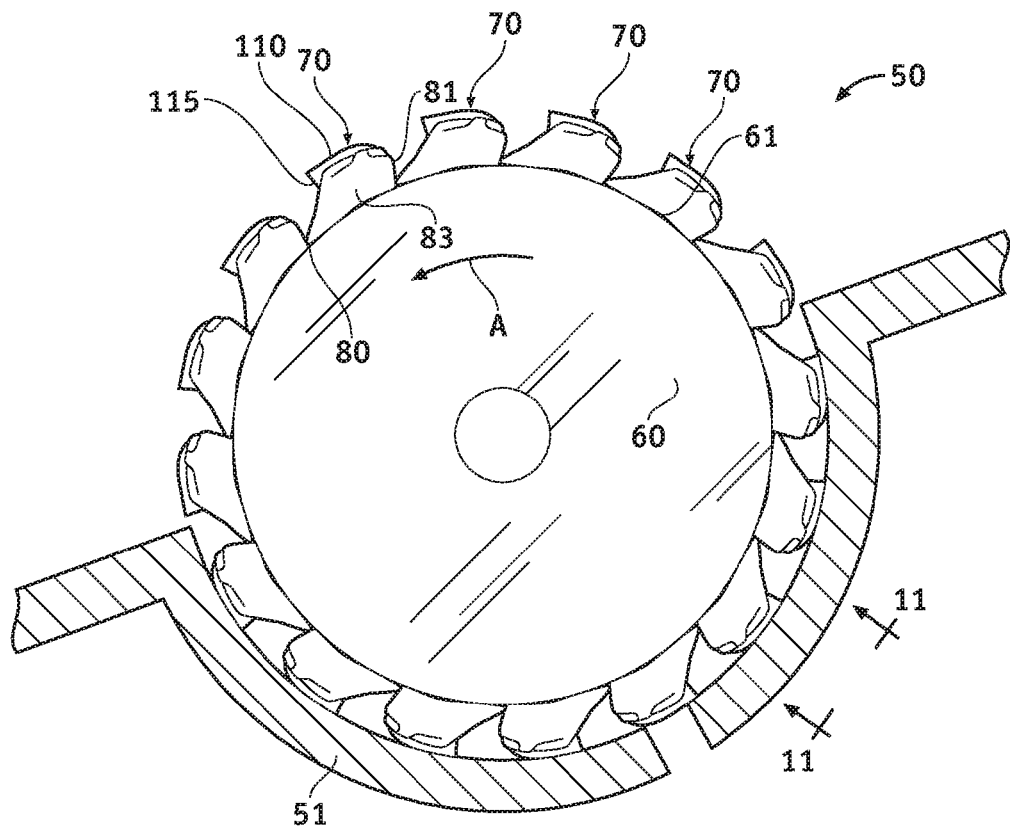
FIG. 10 is an enlarged, highly generalized side elevation view of the thresher and the thresher concave of FIG. 9.

FIG. 1 is a front perspective view of threshing bar 70, a population of which in a particular embodiment is applied to cylindrical exterior 61 of threshing drum 60 being then part of thresher 50 forming an exemplary thresher embodiment of the invention in FIGS. 9 and 10. FIG. 2 is a rear perspective view of threshing bar 70, FIG. 3 is a top plan view of threshing bar 70, FIG. 4 is a bottom plan view of threshing bar 70, FIG. 5 is a front elevation view of threshing bar 70, FIG. 6 is a rear elevation view of threshing bar 70, FIG. 7 is a left side elevation view of threshing bar 70, and FIG. 8 is a right side elevation view of threshing bar 70 shown as it would appear operatively positioned with respect to a section view of thresher concave 51.

Referencing FIGS. 1-8 in relevant part, threshing bar 70 consists of a rigid, integral, unitary threshing body or fixture 71, which is molded of machined of cast iron or steel or other material or combination of materials having the properties of rigidity, resilience, resistance to deformation, and wear resistance. Threshing fixture 71 has a leading edge 80 and an opposed trailing end 81, opposed outer or end faces/surfaces 82 and 83, a top threshing side 84 and an opposed bottom threshing drum emplacement side 85. Leading edge 80 is parallel with respect to trailing end 81. Leading edge 80 has a width W1 that extends from end face 82 to end face 83, and trailing end 81 has a width W2 that extends from end face 82 to end face 83.

Outer or end face 82 is at the upstream end of threshing fixture 71 and is considered the upstream face/surface of threshing fixture 71. Outer or end face 83 is at the downstream end of threshing fixture 71 and is considered the downstream face/surface of threshing fixture 71. End face 82 is on an upstream end of threshing fixture 71 and extends between top threshing side 84 and opposed bottom threshing drum emplacement side 85 of threshing fixture 71 from leading edge 80 of threshing fixture 71 to trailing end 81 of threshing fixture 71. End face 83 is on a downstream end of threshing fixture 71 and extends between top threshing side 84 and opposed bottom threshing drum emplacement side 85 of threshing fixture 71 from leading edge 80 of threshing fixture 71 to trailing end 81 of threshing fixture 71.

Top threshing side 84 has a crop-threshing rasp structure. Top threshing side 84 includes two main surface or face components, namely, a rearward trailing threshing surface or face denoted at 90 and a forward leading threshing surface or face denoted at 91. Trailing threshing face 90 meets leading threshing face 91 at a corner 92 formed in top threshing side 84, which means that trailing threshing face 90 is contiguous with leading threshing face 91 in that trailing threshing face 90 touches leading threshing face 91 at, and along the length of, corner 92. Corner 92 is rounded and blunt in this example, being not sharp, is located between, and is parallel with respect to, leading edge 80 and trailing end 81 of threshing fixture 71, and extends along top threshing side 84 from end face 82 to end face 83. Trailing threshing face 90 is a working, threshing, or rasping face and is broad and exposed and extends between opposed end faces 82 and 83 of threshing fixture 71 from trailing end 81 to corner 92. Leading threshing face 91 is a working, threshing, or rasping face and is broad and exposed like trailing threshing face 90, and extends between opposed end faces 82 and 83 of threshing fixture 71 from corner 92 to leading edge 80. Leading and trailing threshing faces 90 and 91 intersect at corner 92. Leading threshing face 91 inclines downwardly away from and relative to trailing threshing face 90 from corner 92 at an average downward incline of 40 degrees and meets, and cooperates with, bottom threshing drum emplacement side 85 and opposed end faces 82 and 83 of threshing fixture 71 at leading edge 80 to form a wedge 95 in threshing fixture 71, which characterized the forward or leading end of threshing fixture 71 opposing trailing end 81 of fixture 71. In the preferred embodiment leading threshing face 91 inclines downwardly from and relative to trailing threshing face 90 from corner 92 at an average incline of 40 degrees and this is an optimal incline of leading threshing face 91 for providing an optimum threshing action along leading threshing face 91. According to the principle of the invention, a preferred range of average inclination of leading threshing face 91 relative to trailing threshing face 90 is from 35 degrees to 45 degrees.

End face 82 extends between trailing and leading threshing faces 90 and 91 of top threshing side 84 and bottom threshing drum emplacement side 85 of threshing fixture 71 from trailing end 81 to leading edge 80, tapers from corner 92 to leading edge 80, and is in-turned or otherwise angled inwardly in the direction of end face 83 from trailing end 81 to leading edge 80 of threshing fixture 71 forming an oblique crop material deflecting surface of threshing fixture 71, namely, the end face 82 of threshing fixture 71 that is in-turned or otherwise inwardly-angled toward end face 83. Width W2 of trailing end 81 is greater than width W1 of leading edge 80. In an illustrative embodiment, end face 82 is in-turned from and relative to trailing end 81 at an average in-turn or angle of 20 degrees and this provides an optimum deflecting action along end face 82. A preferred range of an average in-turn or angle of end face 82 relative to trailing end 81 is from 16 degrees to 25 degrees.

A rasp structure is formed in and along trailing and leading threshing faces 90 and 91 of top threshing side 84 of threshing fixture 71. This rasp structure consists of alternating crop threshing grooves 100 and vanes 101. Crop threshing grooves 100 are formed in top threshing side 84 of threshing fixture 71, which form and are separated by corresponding upstanding vanes 101. Vanes 101 are elongate and have an equal and generally uniform height and width relative to each other, and grooves 100 are similarly elongate and correspond in length to the lengths of the corresponding vanes 101 and have a generally equal and uniform width and depth relative to each other. Grooves 100 and corresponding vanes 101 are formed in trailing threshing face 90 of top threshing side 84 of threshing fixture 71 and are formed in leading threshing face 91 of top threshing side 84 of threshing fixture 71. Grooves 100 and corresponding vanes 101 extend along threshing fixture 71 in a direction from trailing end 81 of threshing fixture 71 to leading edge 80 of threshing fixture 71. More specifically, grooves 100 and corresponding vanes 101 further extend along top threshing side 84 of threshing fixture 71 from trailing end 81 of threshing fixture 71 to corner 92 formed in top threshing side 84 of threshing fixture 71. Grooves 100 and corresponding vanes 101 further extend downwardly along leading threshing face 91 of top threshing side 84 of threshing fixture 71 from corner 92 and, in the present embodiment, terminate along leading threshing face 91 at an intermediate location relative to corner 92 and leading edge 80 of threshing fixture 71.

Grooves 100 and corresponding vanes 101 are parallel relative to each other, and are substantially parallel relative to the oblique crop material deflecting surface of threshing fixture 71, namely, end face 82 of threshing fixture 71, and are oblique relative to leading edge 80 of threshing fixture 71. As such, grooves 100 and corresponding vanes 101 are downstream directed grooves and vanes in that they are angled toward end face 83 at the downstream end of threshing fixture 71. Grooves 100 and corresponding vanes 101 forming the rasp structure of threshing fixture 71 define crop material conveyance pathways that extend along or otherwise across top threshing side 84 of fixture 71 in the opposite direction along threshing fixture 71 being a direction from leading edge 80 to trailing end 81 and, more particularly, in an angled direction relative to end face 83 of fixture 71 toward trailing end 81 of fixture 71. Grooves 100 and corresponding vanes 101 are substantially parallel relative to the oblique crop material deflecting surface defined by end face 82 of threshing fixture 71, in which the term "substantially parallel" means parallel within a deviation range of from zero to approximately 6 degrees. And so within this range of deviation, grooves 100 and corresponding vanes 101 are substantially parallel relative to the oblique crop material deflecting surface of threshing fixture 71, namely, end face 82 of threshing fixture 71.

Referring to FIGS. 1-8 in relevant part, threshing bar 70 is a spiked threshing bar in that it is formed with a spike 110 for threshing crop cuttings, specifically ahead of trailing threshing face 90 between corner 92 and leading edge 80. Spike 110 is formed in threshing fixture 71. Spike 110 projects or otherwise extends outwardly from top threshing side 84 of threshing fixture 71 relative to the rasp structure formed in top threshing side 94, grooves 100 and vanes 101 in this example, to top 111. More specifically, spike 110 projects or otherwise extends outwardly from trailing threshing face 90 relative to the rasp structure formed in trailing and leading faces 90 and 91 to top 111, from trailing end 80 to corner 92. Spike 110 also projects or otherwise extends outwardly from leading threshing face 91 ahead of corner 92 between corner 92 and leading edge 80 and relative to the rasp structure formed in trailing and leading faces 90 and 91 to top 111, so as to be available for threshing crop cuttings ahead of trailing threshing face 90 and corner 92 between corner 92 and leading edge 80.

Spike 110 is parallel with respect to end face 82 and end face 83. Spike 110 is formed at and along end face 82 of threshing fixture 71. Spike 110 has a rearward or trailing part 112, and an opposed forward or leading part 113. Trailing and leading parts 112 and 113 are integral with one another and are integrally formed with threshing fixture 71 and together project from top threshing side 84 of threshing fixture 71 to top 111 of spike 110. Trailing part 112 is formed along trailing threshing face 90 of top threshing side 84 of threshing fixture 71, and projects outwardly from, or otherwise with respect to, trailing threshing face 90 from trailing end 81 to corner 92. Leading part 113 is formed along leading threshing face 91 of top threshing side 84 of threshing fixture 71, and projects outwardly from, or otherwise with respect to, leading threshing face 91 of top threshing side 84 of threshing fixture 71 from corner 92 to a threshing surface 115 at an intermediate location of leading threshing face 91 between corner 92 and leading edge 80.

Leading part 113 of spike 110 has threshing surface 115. Leading part 113 of spike 110 extends outwardly from leading threshing face 91 to threshing surface 115. Threshing surface 115 extends outwardly along leading part 113 of spike 110 ahead of corner 92, between leading edge 80 and corner 92, from leading threshing face 91 to top 111. Threshing surface 115 is directed outwardly and forwardly of leading threshing face 91 toward leading edge 80 of threshing fixture 71 and away from trailing end 91 of threshing fixture 71 so as to be available for threshing crop cuttings ahead of trailing threshing face 90 between leading edge 80 and corner 92. Threshing surface 115 is blunt. In this example, threshing surface 115 is a flat or otherwise planar surface in this example, and is not sharp, as in a cutting edge. Threshing surface 115 can be rounded in another embodiment of a blunt threshing surface. Because threshing surface 115 is blunt, spike 110 is a blunt crop-threshing spike. Threshing surface 115 is angled forwardly away from trailing end 81 of threshing fixture and toward leading threshing face 91 of threshing fixture 71, and there is a threshing attack angle α of 110 degrees, referenced in FIGS. 1 and 7, between threshing surface 115 of spike 110 and leading threshing face 91 of threshing fixture 71.

Figure 11:
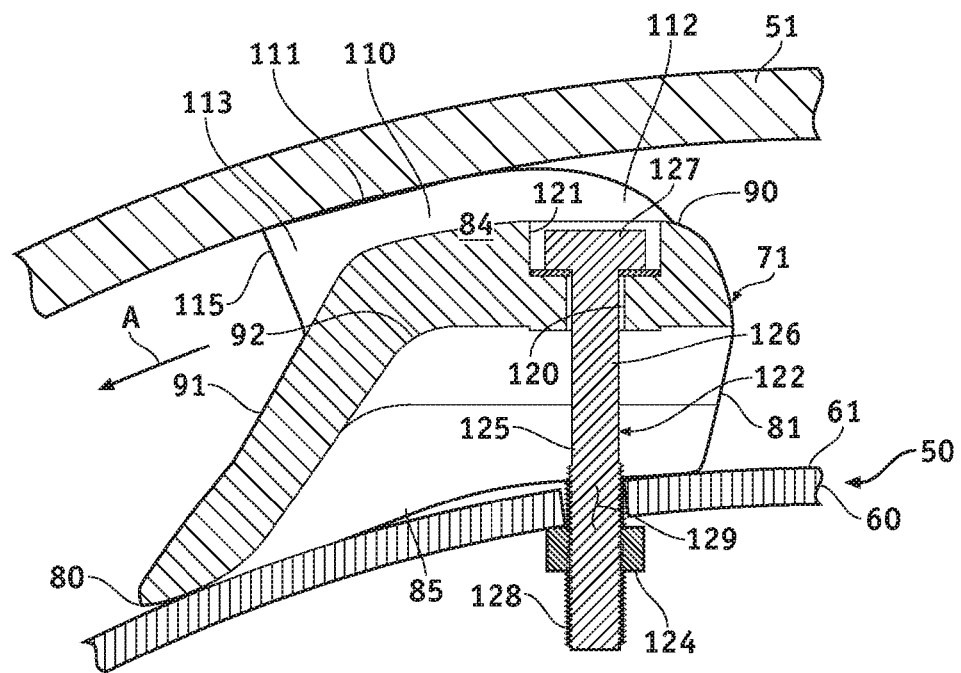
FIG. 11 is a section view taken along line 11-11 of FIG. 10.

In FIGS. 3, 4, and 11, threshing fixture 71 is formed with bore 120 and a corresponding counterbore 121 used to accept, as shown in FIG. 41, a nut-and-bolt fastener 122 for securing threshing bar 70 to cylindrical exterior 61 of threshing drum 60 in FIG. 11. Bore 120 and corresponding counterbore 121 are formed at an intermediate location between end face 82 and end face 83. Bore 120 and corresponding counterbore 121 are located at an intermediate location between corner 92 and trailing end 81 of threshing fixture 71, and extend through fixture 71 from trailing threshing face 90 of top threshing side 84 of threshing fixture 71 to a cavity 123 formed in bottom threshing drum emplacement side 85 of threshing fixture 71. Counterbore 121 is directed inwardly to bore 120 through trailing threshing face 90 of top threshing side of threshing fixture 71.

In FIG. 11, nut-and-bolt assembly 122 consists of nut 124 and a corresponding bolt 125 that includes an elongate shank 126 having a head 127 and an opposed threaded end 128. In the installation of threshing bar 70, bottom threshing drum emplacement side 85 of threshing bar 70 is set onto cylindrical exterior 61 of threshing drum 60, and threshing side 84 of threshing bar 70 and the rasp structure formed therein faces outwardly toward and confronts thresher concave 51. Threshing bar 70 is positioned so as to direct leading edge 80 and leading threshing face 91 and threshing surface 115 of spike 100 into the threshing direction of rotation of threshing drum 60 indicated by arrowed line A, so as to direct end face 82 toward the upstream end or location of threshing drum 60, and so as to direct end face 83 toward the downstream end or location of threshing drum 60, whereby in response to rotation of threshing drum 60 in the threshing direction of rotation threshing bar 70 leads with leading edge 80 and trails with trailing end 81 and a crop applied between cylindrical exterior 61 of threshing drum 60 and thresher concave 51 is threshed by and between thresher concave 51 and spike 110 and top threshing side 84 of threshing bar 70. Bottom threshing drum emplacement side 85 of threshing bar 70 is contoured to be received by cylindrical exterior 61 of threshing drum 60.

In the installation of nut-and-bolt assembly 122 as shown in FIG. 41, head 127 is set into and is received by counterbore 121 such that it is located under top threshing side 84 so as not to interfere with the threshing action carried out by grooves 100 and corresponding vanes 101 formed in top threshing side 84. Shank 126 extends downwardly from head 127 through bore 120 and into and through cavity 123 to threaded end 128, which is applied through an opening 129 formed through threshing drum 60. Nut 124 is threaded onto threaded end 128 of shank 126 along the underside of threshing drum 60 and is tightened to firmly and rigidly secure threshing bar 70 in place relative to cylindrical exterior 61 of threshing drum 60.

A population of threshing bars 70 is emplaced and affixed to cylindrical exterior of threshing drum 60, as generally depicted in FIGS. 9 and 10, to form an exemplary thresher 50 according to the principle of the invention. In FIG. 9, threshing bars are denoted at 70, and are shown set onto cylindrical exterior 61 of threshing drum 60 in preparation for threshing. Threshing bars 70 are positioned with their leading edges 80 and leading threshing faces 91 and threshing surfaces 115 of spikes 150 facing or otherwise directed into the threshing direction of rotation of threshing drum 60 indicated by arrowed line A so to direct their end faces 82 toward the upstream location 50A of threshing drum 60, and so as to direct their end faces 83 toward the downstream location 50B of threshing drum 60. Because end faces 82 of threshing bars 70 are directed toward upstream location of threshing drum 60, the oblique crop material deflecting surfaces of threshing bars 70, end faces 82, also face upstream location 50A of threshing drum 60, and is oblique and angled toward upstream location 50A of threshing drum 60 relative to the threshing direction of rotation of threshing drum 60 as indicated by arrowed line A. In response to rotation of threshing drum 60 in the threshing direction of rotation denoted by arrowed line A, threshing bars 70 lead with their leading edges 80 and trail with their trailing ends 81 and crop cuttings applied between cylindrical exterior 61 of threshing drum 60 and thresher concave 51 are threshed by and between spike 115 and the rasp structures formed in the top threshing sides 84 of threshing bars 70 and thresher concave 51 separating the grains from the chaff to form threshings, namely, the chaff and the separated grains. In the customary operation of the combine harvester, the grains fall through sieves 57 in FIG. 10 into the collection tank inside the combine harvester.

In FIGS. 9, 10, and 11, as each threshing bar 70 is rotated by threshing drum 60 along the threshing direction of rotation the crop cuttings to be threshed are received between top threshing side 84 of threshing bar 70 and thresher concave 51, in which the crop cuttings to be threshed are applied to and across top threshing side 84 and encounter top threshing side 84 from leading edge 80 to trailing end 81 and impact leading threshing face 91 and then spike 110 and then impact and encounter the rasp structure consisting of grooves 100 and corresponding vanes 101 applied along leading threshing face 91 and trailing threshing face 90 imparting a threshing action against the crop cuttings to form threshings. The previously described incline of leading threshing face 91 relative to trailing threshing face 90, and the grooves 100 and corresponding vanes 101 forming the rasp structure along leading threshing face 91 and trailing threshing face 90 cooperate to cause threshing bar 70 to perform an aggressive threshing of the crop cuttings to be threshed. In fact, leading threshing face 91 faces upwardly toward thresher concave 51 and faces into the threshing direction of rotation of threshing drum 60 indicated by arrowed line A and inclines downwardly from trailing threshing face 90 to cylindrical exterior 61 of threshing drum 60 at an average downward incline of 40 degrees relative to trailing threshing face 90, and in response to rotation of threshing drum 60 in the threshing direction of rotation crop cuttings initially impact leading threshing face 91 at a steep and oblique impaction angle of 50-60 degrees and the defined incline of leading threshing face 91 as described thus provides an aggressive initial impaction against the crop cuttings in the threshing of such crop cuttings but not so aggressive so as to cause an initial over-threshing of the crop cuttings. The crop cuttings and threshings are forced along the vanes 101 and into and through the grooves 100 defining the crop material conveyance pathways of the rasp structure of threshing fixture 71 in a rearward direction from leading edge 80 to trailing end 81 and further in an angled direction from end face 83 of fixture 71 to trailing end 81 of fixture 71 and are thrust outwardly therefrom toward upstream location 50A of threshing drum 60 and away from end face 82, in response to movement of threshing bar 70 along the threshing direction of rotation of threshing drum 60 leading with leading edge 80. This thrusting of crop cuttings and threshings along and through the crop material conveyance pathways defined by the rasp structure of threshing fixture 71 toward upstream location 50A of threshing drum slows the conveyance of this material along thresher 50 from upstream location 50A to downstream location 50B thereby prolonging the applied threshing action to the crop cuttings to provide a thorough, repeated, more prolonged, and aggressive threshing of the crop cuttings to be threshed as thresher 50 rotates. And so the rasp structure formed by grooves 100 and corresponding vanes 101 creates contact of the crop cuttings against the concave allowing more crop cuttings to rub together, and the rasp structure is aggressive and yet gentle on the crop cuttings to allow the crop cuttings to be managed through and along the crop material conveyance pathways formed by grooves 100 and corresponding vanes 101. The rasp structure of threshing fixture 71 defined by grooves and corresponding vanes 101 as herein described reduces the possibility of over-threshing, prevents cracks and splits in seed coats, and is suitable for all crops, and especially corn, beans, and small grain crops.

In response to rotation of threshing drum 60 in the threshing direction of rotation denoted by arrowed line A, threshing bars 70 lead with their leading edges 80 and trail with their trailing ends 81 and crop cuttings applied between cylindrical exterior 61 of threshing drum 60 and thresher concave 51 are threshed by and between top threshing sides 84 of threshing bars 70 and thresher concave 51 separating the grains from the chaff to form threshings, namely, the chaff and the separated grains. In response to rotation of threshing drum 60 in the threshing direction of rotation denoted by arrowed line A, threshing surface 115 of spike 110 initially threshes crop cuttings applied between cylindrical exterior 61 of threshing drum 60 and thresher concave 51 ahead of corner 92 and trailing threshing face 90 between leading edge 80 and corner 92. The crop cuttings initially threshed by spike 110 are then further threshed by and between trailing threshing face 90, between corner 92 and trailing end 81, and thresher concave 51 separating the grains from the chaff to form threshings, namely, the chaff and the separated grains. Again, spike 110 initially threshes the crop cuttings ahead of trailing threshing face 90 between corner 92 and leading edge 80, which initially threshed crop cuttings are then threshed further by trailing threshing face 90. A conveyance (not shown) of combine harvester 50, such as an auger, conveys the threshings along the rotating thresher 50 from upstream location 50A of thresher 50 to downstream location 50B of thresher 50 where the grains fall through sieves 57 into the collection tank of the combine harvester.

The provision of spike 110 that initially threshes the crop cuttings ahead of trailing threshing face 90 allows thresh bar 70, and also other thresh bars, to more efficiently thresh crops such as wheat, barley, and rice having tough straw. As explained above, threshing surface 115 is angled forwardly away from trailing end 81 of threshing fixture and toward leading threshing face 91 of threshing fixture 71, and there is a threshing attack angle $\alpha$ of 110 degrees (FIGS. 1 and 7) between threshing surface 115 of spike 110 and leading threshing face 91 of threshing fixture 71. This attack angle $\alpha$ enables spike 110 to initially aggressively thresh the crop cuttings in preparation for being threshed further by trailing threshing face 90.

Threshing surface 115 is sufficiently angled forwardly away from trailing end 81 of threshing fixture and toward leading threshing face 91 of threshing fixture 71 to provide an aggressive threshing of crops having tough straw ahead of trailing threshing face 90, without producing hair-pinning of crop cuttings around threshing face 115 and without producing blow-by of crop cuttings past threshing face 115 that would cause threshing surface 115 of spike to lose its ability to pre-thresh the crop cuttings according to this disclosure. This "pre-threshing" performed by spike 110 to produce pre-threshed crop material enables trailing threshing face 90 of top threshing side 82 to more efficiently thresh the pre-threshed crop material compared to when the crop cuttings are not pre-threshed. To enable threshing surface 115 to pre-thresh crop cuttings ahead of trailing threshing face 90 to enable trailing face 90 to more efficiently thresh the pre-threshed crop cuttings and to prevent crop cuttings from hair-pinning around threshing surface 115 and for preventing crop cuttings from blowing by threshing surface 115, in an illustrative embodiment the attack angle $\alpha$ between threshing surface 115 and leading threshing face 91 is from 100 degrees to 120 degrees, with the optimum attack angle $\alpha$ being 110 degrees. Again, the optimum attack angle $\alpha$ of 110 degrees and the range of attack angle $\alpha$ of from 100 degrees to 120 degrees, enables threshing surface 115 to pre-thresh crop cuttings ahead of trailing threshing face 90 to enable trailing face 90 to more efficiently thresh the pre-threshed crop cuttings, while preventing crop cuttings from hair-pinning and clogging around threshing surface 115, and while preventing crop cuttings from blowing by threshing surface 115. In other words, the optimum attack angle α of 110 degrees and the range of attack angle α of from 100 degrees to 120 degrees, enables threshing surface 115 to pre-thresh crop cuttings ahead of trailing threshing face 90 to enable trailing face 90 to more efficiently thresh the pre-threshed crop cuttings, while disabling crop cuttings from hair-pinning and clogging around threshing surface 115 and blowing by threshing surface 115. And so the optimum attack angle α of 110 degrees and the range of attack angle α of from 100 degrees to 120 degrees thereby enables threshing surface 115 to pre-thresh crop cuttings ahead of trailing threshing face 90 to enable trailing face 90 to more efficiently thresh the pre-threshed crop cuttings without crop cuttings hair-pinning and clogging around threshing surface 115 and blowing by threshing surface 115.

FIG. 9 illustrates a population of threshing bars 70 applied to cylindrical exterior 61 of threshing drum 60 in a pattern extending between upstream location 50A of thresher 50 and downstream location 50B of thresher 50. As each threshing bar 70 is rotated along the threshing direction of rotation, it is to be emphasized that part of the crop cuttings to be threshed impacts the oncoming oblique crop material deflecting surface, end face 82, which deflects the crop cuttings outwardly therefrom toward upstream location 50A of threshing drum 60 and away from end face 82. This deflection of crop cuttings toward upstream location 50A of threshing drum 60 as deflected by end face 82 further slows the conveyance of this material along thresher 50 from upstream location 50A to downstream location 50B thereby prolonging the applied threshing action to the crop cuttings to provide a thorough, repeated, more prolonged, and aggressive threshing of the crop cuttings to be threshed as thresher 50 rotates.

Threshing bar 70 incorporating spike 11 incorporates a particular type of rasp structure that is structured to perform a crop-threshing function. The rasp structure of threshing bar 70 is instructive of a particular type of rasp structure in a threshing bar incorporating spike 11 and that top threshing side 84 of threshing bar 70 can be configured with other configurations of rasp structures.

The invention has been described above with reference to illustrative embodiments. However, those skilled in the art will recognize that changes and modifications may be made to the embodiments without departing from the nature and scope of the invention. Various changes and modifications to the embodiment herein chosen for purposes of illustration will readily occur to those skilled in the art. To the extent that such modifications and variations do not depart from the spirit of the invention, they are intended to be included within the scope thereof.

Having fully described the invention in such clear and concise terms as to enable those skilled in the art to understand and practice the same, the invention claimed is:

1. A spiked threshing bar, comprising:
  a rigid, integral, unitary threshing fixture includes a leading edge and an opposed trailing end, a first outer face and an opposed second outer face, a top threshing side and an opposed bottom threshing drum emplacement side;
  the opposed first and second outer faces extend between the top threshing side and the opposed bottom threshing drum emplacement side of the threshing fixture from the leading edge of the threshing fixture to the trailing end of the threshing fixture;
  the top threshing side includes a trailing threshing face and a leading threshing face that meet at a corner formed in the top threshing side, the corner is between the leading edge and the trailing end of the threshing fixture and extends from the first face to the second face;
  the trailing threshing face extends between the opposed first and second outer faces of the threshing fixture from the trailing end to the corner;
  the leading threshing face extends between the opposed first and second outer faces of the threshing fixture from the corner to the leading edge, and inclines downwardly relative to the trailing threshing face from the corner and meets, and cooperates with, the bottom threshing drum emplacement side and the opposed first and second outer faces of the threshing fixture at the leading edge to form a wedge in the threshing fixture;
  a spike has a threshing surface, the spike extends outwardly from the leading threshing face to the threshing surface, the threshing surface extends outwardly from the leading threshing face, is between the leading edge and the corner, and is directed outwardly and forwardly of the leading threshing face toward the leading edge of the threshing fixture to be available for threshing crop cuttings ahead of the corner and the trailing threshing face; and
  a threshing attack angle of from 100 degrees to 120 degrees between the threshing surface of the spike and the leading threshing face.

2. The spiked threshing bar according to claim 1, wherein the threshing surface is planar.

3. The spiked threshing bar according to claim 1, wherein the trailing threshing face includes crop-threshing grooves.

4. A spiked threshing bar, comprising:
  a rigid, integral, unitary threshing fixture includes a leading edge and an opposed trailing end, a first outer face and an opposed second outer face, a top threshing side having a crop-threshing rasp structure, and a bottom threshing drum emplacement side;
  the opposed first and second outer faces extend between the top threshing side and the opposed bottom threshing drum emplacement side of the threshing fixture from the leading edge of the threshing fixture to the trailing end of the threshing fixture;
  the top threshing side includes a trailing threshing face and a leading threshing face that meet at a corner formed in the top threshing side, the corner is between the leading edge and the trailing end of the threshing fixture and extends from the first face to the second face;
  the trailing threshing face extends between the opposed first and second outer faces of the threshing fixture from the trailing end to the corner;
  the leading threshing face extends between the opposed first and second outer faces of the threshing fixture from the corner to the leading edge, and inclines downwardly relative to the trailing threshing face from the corner and meets, and cooperates with, the bottom threshing drum emplacement side and the opposed first and second outer faces of the threshing fixture at the leading edge to form a wedge in the threshing fixture;
  a spike has a threshing surface, the spike extends outwardly from the leading threshing face of the top threshing side relative to crop threshing rasp structure to the threshing surface, the threshing surface extends outwardly from the leading threshing face, is between the leading edge and the corner, and is directed outwardly and forwardly of the leading threshing face toward the leading edge of the threshing fixture to be available for threshing crop cuttings ahead of the corner and the trailing threshing face; and a threshing attack angle of from 100 degrees to 120 degrees between the threshing surface of the spike and the leading threshing face.

5. The spiked threshing bar according to claim 4, wherein the threshing surface is planar.

6. The spiked threshing bar according to claim 4, wherein the crop-threshing rasp structure comprises grooves.

* * * * *